(12) United States Patent
Gaul et al.

(10) Patent No.: US 8,487,931 B2
(45) Date of Patent: Jul. 16, 2013

(54) DYNAMIC FEEDBACK AND INTERACTION FOR PARAMETRIC CURVES

(75) Inventors: Troy A. Gaul, Shoreview, MN (US); Benjamin A. Zibble, Saint Paul, MN (US); Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1464 days.

(21) Appl. No.: 11/821,399

(22) Filed: Jun. 22, 2007

(65) Prior Publication Data

US 2008/0062177 A1 Mar. 13, 2008

Related U.S. Application Data

(60) Provisional application No. 60/842,746, filed on Sep. 7, 2006.

(51) Int. Cl.
*G09G 5/00* (2006.01)
*G06T 11/20* (2006.01)
*G06T 11/40* (2006.01)

(52) U.S. Cl.
CPC ............ *G06T 11/206* (2013.01); *G06T 11/203* (2013.01); *G06T 11/40* (2013.01)
USPC ..... 345/440; 345/441; 345/440.1; 345/440.2; 345/442

(58) Field of Classification Search
CPC ........ G06T 11/206; G06T 11/40; G06T 11/203
USPC .................................................. 345/440–442
See application file for complete search history.

(56) References Cited

U.S. PATENT DOCUMENTS

| 4,686,635 | A | 8/1987 | Schrieber |
| 5,982,379 | A * | 11/1999 | Suzuki et al. ................. 345/593 |
| 6,323,852 | B1 | 11/2001 | Blower, Jr. et al. |
| 6,429,869 | B1 | 8/2002 | Kamakura et al. |
| 6,847,376 | B2 | 1/2005 | Engeldrum et al. |
| 7,079,144 | B1 | 7/2006 | Shimada et al. |
| 7,286,131 | B2 * | 10/2007 | Brodie et al. ................. 345/442 |
| 2002/0041287 | A1 | 4/2002 | Engeldrum et al. |
| 2004/0057061 | A1 * | 3/2004 | Bochkarev ..................... 358/1.9 |
| 2004/0146170 | A1 | 7/2004 | Zint |
| 2005/0041029 | A1 | 2/2005 | Felt |
| 2005/0163368 | A1 * | 7/2005 | Hanamoto ..................... 382/162 |
| 2006/0203298 | A1 * | 9/2006 | Kuwata et al. ................. 358/448 |

OTHER PUBLICATIONS

International Preliminary Report on Patentability for PCT Application No. PCT/US07/77787, dated Mar. 19, 2009, 6 pages.
International Search Report for PCT Application No. PCT/US07/77787.

\* cited by examiner

*Primary Examiner* — Jin-Cheng Wang
(74) *Attorney, Agent, or Firm* — Wolfe-SBMC

(57) ABSTRACT

Methods, program products and systems for accepting user input selecting a parameter for a parametric curve, the parametric curve being displayed in a graph. A range of curves for the parametric curve is determined based on a range of values for the parameter. And the range of curves for the parameter is displayed in the graph of the curve.

34 Claims, 13 Drawing Sheets
(8 of 13 Drawing Sheet(s) Filed in Color)

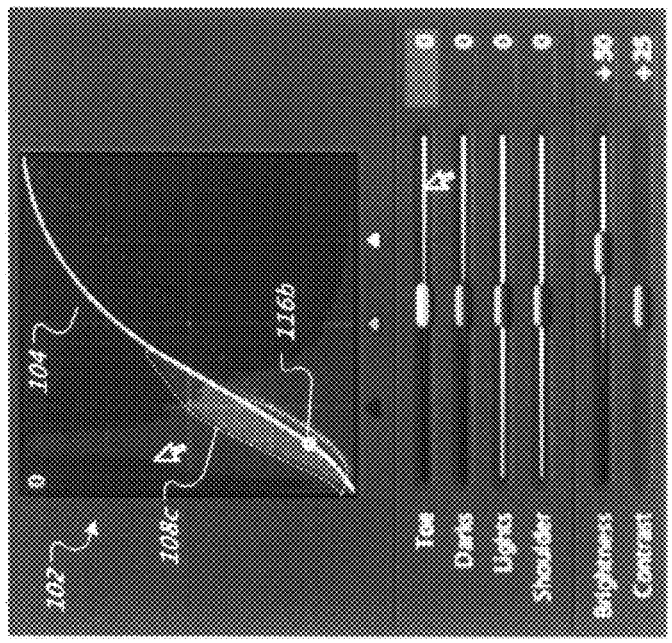
FIG. 2B
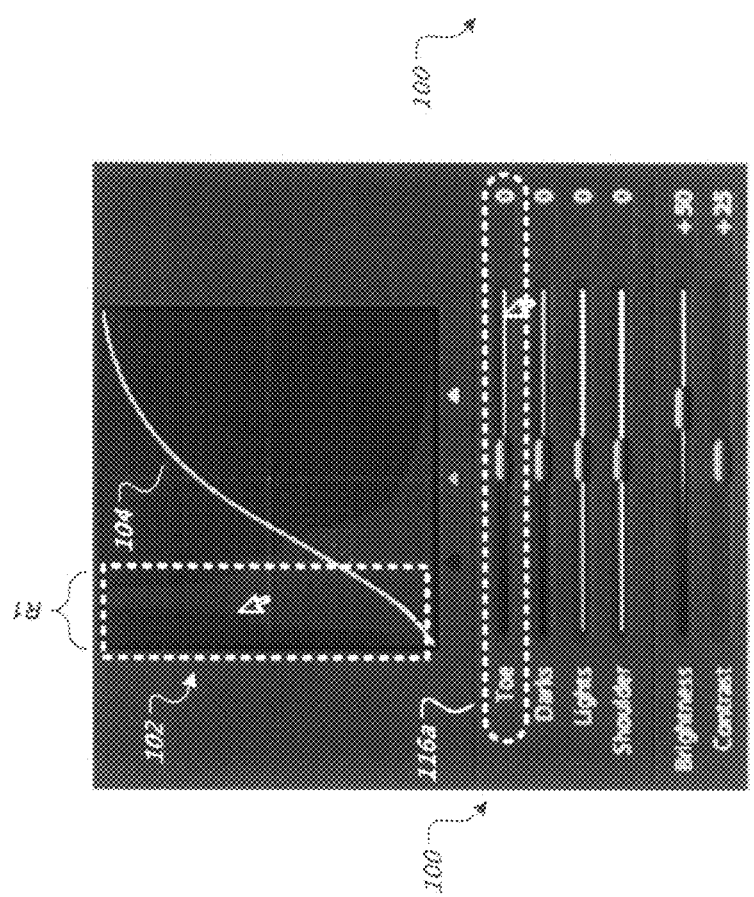
FIG. 2A
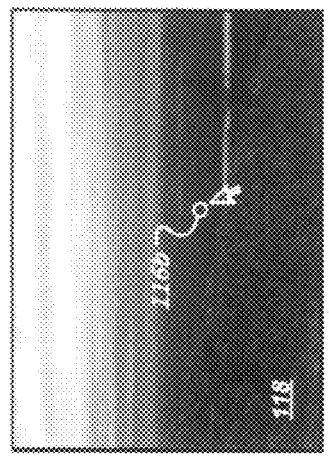

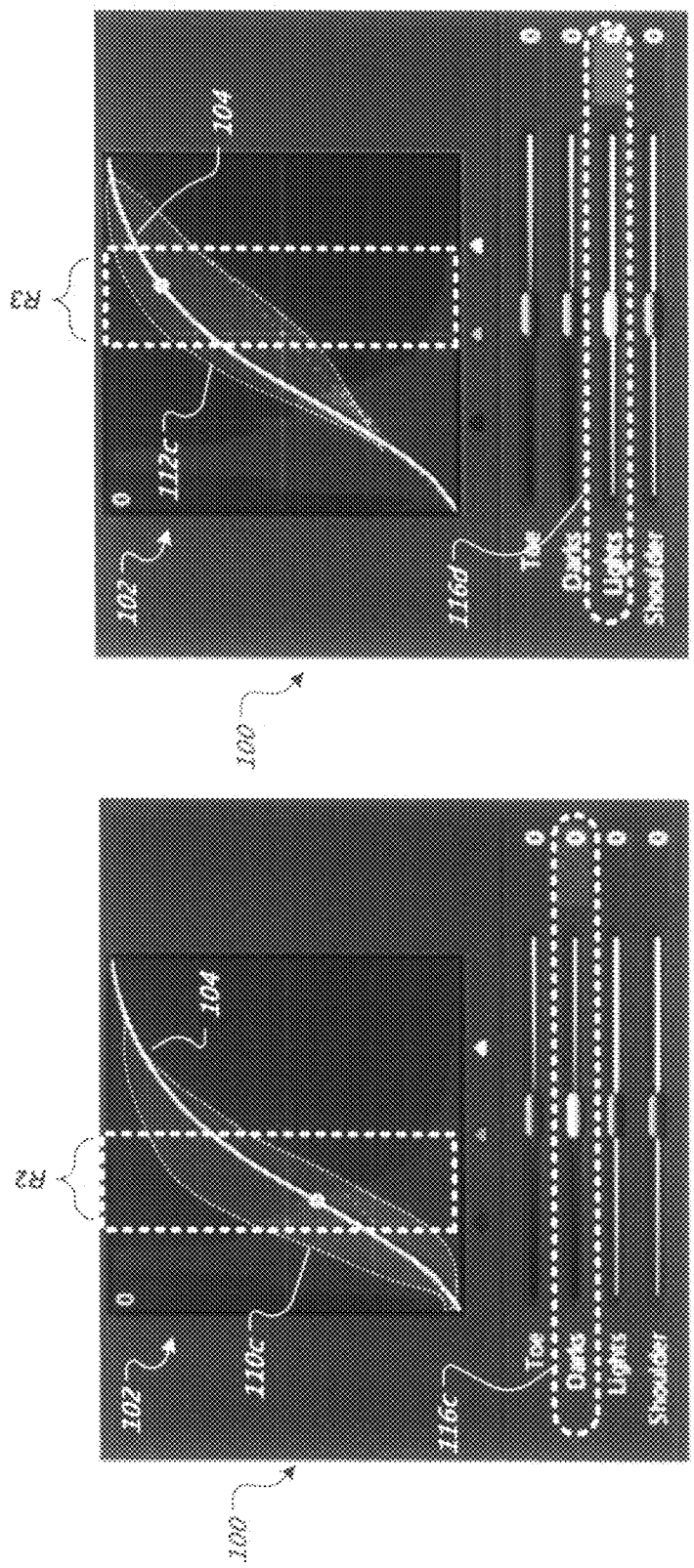

DYNAMIC FEEDBACK AND INTERACTION FOR PARAMETRIC CURVES

CROSS-REFERENCE TO RELATED APPLICATIONS

This application claims priority to U.S. Patent Application No. 60/842,746, entitled DYNAMIC FEEDBACK AND INTERACTION FOR PARAMETRIC CURVES, to Mark Hamburg, et al., which was filed on Sep. 7, 2006; the disclosure of the prior application is considered part of (and is incorporated by reference in) the disclosure of this application.

BACKGROUND

Many operations in fields such as image processing and audio processing can typically be described based on an interactive user interface control that maps an input value either directly to an output value or to some other parameter that will then affect the processing. For example, such controls can allow users to interactively adjust function curves such as tone curves and hue-based curves for image processing, and frequency-response curves for audio processing. In the case of tone curves, an image component value for each pixel is typically fed into the function and a resulting new component value is produced by the function. In the case of hue-based curves, the hue of each pixel is fed into the function and a resulting parameter value is produced to be used in further processing of the pixel. For example, one might use hue to control how much lighter or darker to make a pixel. Finally, given an input audio frequency, a frequency-response curve provides an indication of the amount of gain or cut to be applied to that portion of the audio spectrum.

As single input, single output functions, these functions can be described by the corresponding curve that is plotted by mapping all input values to their corresponding output values. Typical image manipulation applications allow users to specify curves directly by specifying a series of points that the curve must pass through. Specifying curves via points, however, makes it easy to produce curves with undesirable properties. For example, for an image tone curve, clipping against the extremes of the range will generally result in a loss of detail and retrograde motion—i.e., decreasing sections of the curve—will result in solarization effects. Some applications avoid this predicament by allowing users to manipulate curves through a small set of controls for continuous, bounded parameters. Such curves are termed parametric curves. While a point-based curve is essentially specifying parameters to a curve generating process, with a parametric curve the parameters are abstracted away from being simply locations along the function graph. But the abstracted nature of the parameters can make it harder for users to understand how they in fact relate to the curve.

SUMMARY

This specification describes technologies relating to interactive image manipulation.

In general, one aspect of the subject matter described in this specification can be embodied in a method that includes accepting user input selecting a parameter for a parametric curve, the parametric curve being displayed in a graph. A range of curves for the parametric curve is determined based on a range of values for the parameter. The range of curves for the parameter is displayed in the graph of the curve. Other embodiments of this aspect include corresponding systems, apparatus, and computer program products.

These and other embodiments can optionally include one or more of the following features. A control corresponding to the parameter is highlighted. The user input is one of: indication of a parameter control, indication of a region in the graph, or indication of a pixel in an image corresponding to a location on the curve. User input modifying a value of the parameter can be accepted. The user input is one or more of a mouse gesture or a keystroke. An upward mouse gesture increases a value of the parameter and a downward mouse gesture decreases a value of the parameter. A new curve based on the value of the parameter is determined and displayed in the graph. The range of curves represents one or more areas about the curve in the graph in which the curve will lie based on different values of the parameter. The curve is a combination of cubic curves. The parameter controls a slope of the curve. The parameter does not correspond to a location along the graph of the curve. The curve determines tone for an image.

In general, one aspect of the subject matter described in this specification can be embodied in a method that includes accepting first user input indicating a region in a displayed graph or indicating a displayed control corresponding to the region, the control being in a separate display area from the graph. The region and the control are automatically highlighted in response to the first user input. A value associated with the control is automatically adjusted based on second user input. Other embodiments of this aspect include corresponding systems, apparatus, and computer program products.

These and other embodiments can optionally include one or more of the following features. The user input is a mouse gesture. An upward mouse gesture increases the value and a downward mouse gesture decreases the value. The gesture input is incident on the displayed graph. The displayed graph is a histogram.

Particular embodiments of the subject matter described in this specification can be implemented to realize one or more of the following advantages. Curve ranges provide users a graphical way of understanding how curve parameters will affect the graph of a parametric curve and shows the user at a glance which parameter control does what, how much effect the control will have on parts of the image, and how close the curve currently is to either extreme for a given parameter. A user interface for parametric curves simplifies the complex task of curve adjustment. User interaction with a parametric curve graph is automatically mapped to an underlying parameter. Subtle adjustments of parametric curves are easier to achieve than manually manipulating points on a curve graph.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-G illustrate displaying of curve ranges in a parametric curve graph.

Like reference numbers and designations in the various drawings indicate like elements.

DETAILED DESCRIPTION

Figure 1:
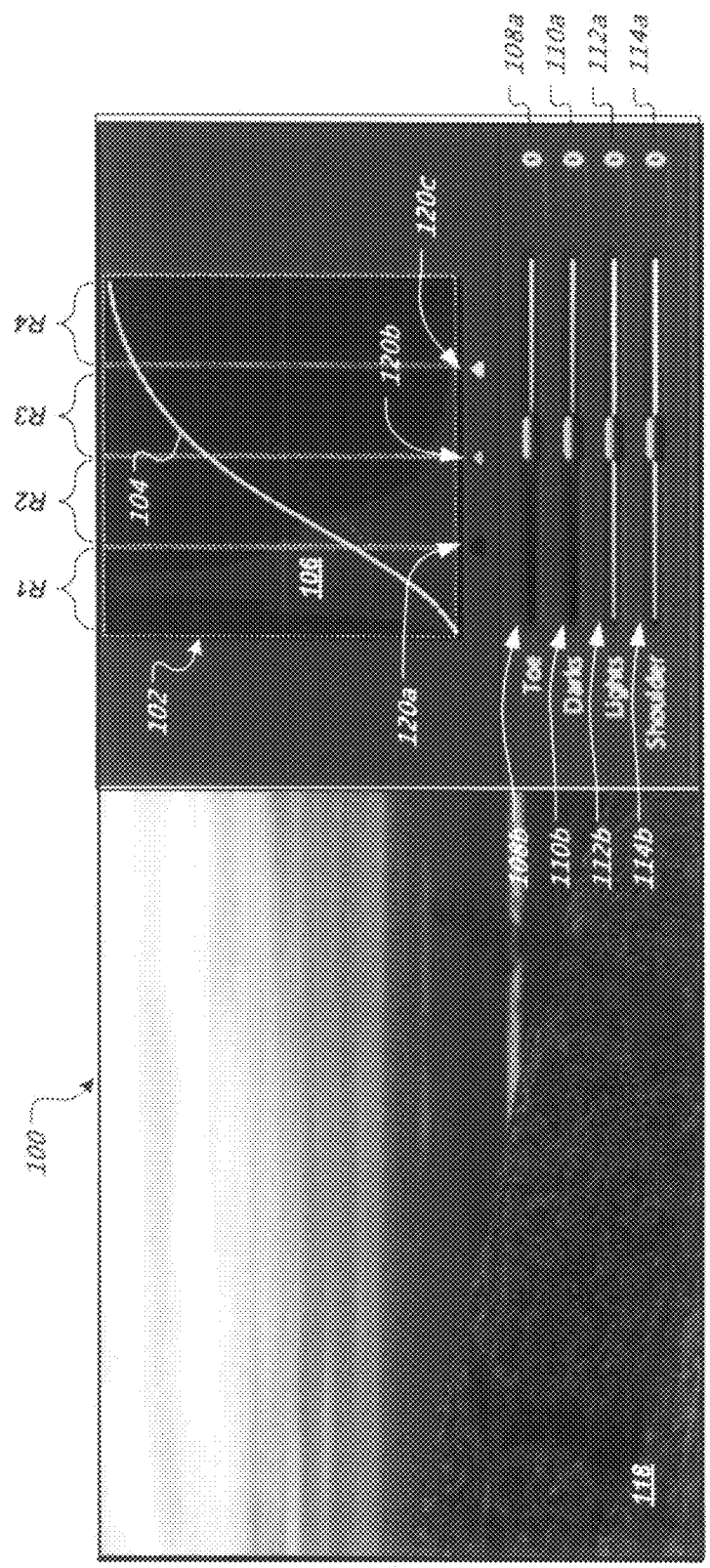
FIG. 1 shows a user interface for manipulating a parametric curve.

FIG. 1 shows a graphical user interface (GUI) 100 for manipulating a parametric curve shown in graph 102 as curve 104. Although the illustrated parametric curve 104 is a plane curve, other parametric curves are possible, including space curves. For example, space curves can be presented in an n-dimensional graph or projected onto a plane and presented in graph 102. A parametric curve represents one or more transformations of a set of data. Such transformations can include, for instance, tone, frequency response, opacity, or other kinds of transformations, including combinations of these. The set of data can be pixels in a digital image (e.g., 118; which for brevity will simply be referred to as an image), audio data, or other types of data. Besides images, other visual representations of data are possible such as, for example, histogram 106 which lies beneath parametric curve 104 in graph 102 and represents color distribution in the image 118 with darker colors being closer to the origin on the x-axis.

In some implementations, the parametric curve 104 represents image tone. Tone is a measure of the brightness or darkness of a color. In these implementations, the graph 102 represents input tonal values (x-axis) verses output tonal values (y-axis) for colors in the image 118. Generally speaking, a tone curve goes from black to white (or white to black) and is always increasing. A parametric curve that is a straight, 45° line would indicate that there is no change to tonal values, for example. The shape of the parametric curve 104, and hence the tone of colors in the image 118, can be manipulated by users indirectly through bounded parameters associated with the parametric curve 104.

Particularly for tasks requiring subtle changes to the curve 104, this simplifies the complex task of curve adjustment by allowing users to easily manipulate components of the curve 104 instead of having to explicitly change the shape of the curve (e.g., by dragging points on the curve) which may not give users the control they need. Indeed, a curve's possible shapes may lack an intuitive relationship to desired modifications of the image 118. An example of the sort of thing that is "easy" with parametric curves and "hard" with point-based curves is getting the curve to head toward a slope of zero at the end points without actually overshooting. Curve fitting algorithms that produce smooth curves such as natural splines tend to overshoot. Algorithms that avoid overshoot tend to produce less smooth curves.

In general, users can "indicate" an object of interest presented in the user interface 100 by providing user input (e.g., one or more mouse clicks or other gestures on a GUI control or in the vicinity of the control, keystrokes, positioning a cursor over or in the vicinity of a control, speech commands, or other suitable input). User interaction with the parametric curve 104 maps to one or more underlying parameters that can be modified to change the shape of the curve 104. The parameters can be input parameters of the curve 104 function, output parameters of the curve 104 function, or combinations of these. One or more parametric curve parameters map to a visible area or "region" in the graph 102. A region can be any shape or size, does not have to have the same shape or size as other regions for a given parametric curve, and can have more than two dimensions in the case of parametric space curves. Moreover, regions can be overlapping.

In graph 102, there are four regions indicated by rectangles R1, R2, R3 and R4. Users can modify a parameter's value by interacting with the parameter's corresponding region in the graph 102, by interacting with a control (e.g., 108a-b, 110a-b, 112a-b and 114a-b) that corresponds to the parameter, or by interacting with the representation of data 118. The user interface 100 includes, for instance, parameter controls such as sliders (e.g., 108b, 110b, 112b and 114b) and corresponding text input fields (e.g., 108a, 110a, 112a and 114a) for manipulating parameters. Each control 108a-b, 110a-b, 112a-b and 114a-b corresponds to a region (and hence a tone parameter) in the graph 102. Controls 108a-b correspond to region R1 and allow manipulation of a parameter associated with region R1. Similarly, controls 110a-b correspond to region R2 and allow manipulation of a parameter associated with region R2, and so on. In this illustration of the tone curve 104, the controls 108a-b allow manipulation of a parameter that effects the tone of the darkest colors whereas the remaining controls each allow manipulation of a parameter that affects the tone of progressively lighter colors with the tone of the lightest colors being influenced by controls 114a-b.

In some implementations, a parameter corresponds to the slope of a cubic curve. For example, the four controls (108a-b, 110a-b, 112a-b and 114a-b) allow modification to the slopes of four different cubic curves that are combined together in a cascaded function to create the curve 104. By way of illustration, a region friendly parametric curve operating on the range from 0 to 1 can be built from one basic component: a cubic function mapping 0 . . . 1 to 0 . . . 1 parameterized by the slope at 0 and at 1. If there is a slope A at 0 and B at 1, this function can be defined by:

$$f(x,A,B)=x*((1-x)*(A+x*(3-B-A))+x^2)$$

To avoid retrograde motion, the ranges for A and B can be restricted, but the usable range is still reasonably large.

Now, consider specifying slopes C and D and using the following logic:

$$g(x,C,D)=\text{if } x \leq 0.5 \text{ then } 0.5*f(2x,C,1) \text{ else } 0.5+0.5*f(2x-1,1,D)$$

In other words, we use a cubic curve to get from 0 to 0.5 ending with slopes ranging from C to 1 and then use another cubic curve to get from 0.5 to 1 with slopes ranging from 1 to D. The curve passes through the points (0,0), (0.5,0.5), and (1,1). We can then cascade this with another cubic working on the full range to get:

$$h(x,C,A,B,D)=f(g(x,C,D),A,B)$$

This yields a curve in which A and B control the large scale response of the curve and C and D control the bending of the curve at each end. A natural subdivision into ranges splits the curve at 0.25, 0.5, and 0.75 to produce four equal sized ranges associated with C, A, B, and D respectively.

We can further provide control over the subdivision into ranges by noting that if we take a function p with inverse q and if p maps a location y to 0.5 then $$q(h(p(x),C,A,B,D))$$

This gives us a function with the split between the lower and upper range at y instead of 0.5. We can insert similar such functions and inverse pairs into the subrange functions used to apply C and D and these will result in a skewing of the curve response while preserving the actual slopes at the end points. So long as the slopes do not go to zero or infinity, wrapping p and q around the curve function leaves the slopes at the end points unchanged. This follows from the chain rule for differentiation and the fact that the functions all preserve 0 and 1.

One such pair of functions is as follows. To map an input value y<0.5 to 0.5, we use:

$$alpha=(1-2y)/(1-y)$$

$$p(x)=x/(1-alpha*(1-x))$$

$$q(x)=1-((1-x)/(1-alpha*x))$$

For y>0.5, we use similar functions:

$$beta=(2y-1)/y$$

$$p(x)=1-((1-x)/(1-beta*x))$$

$$q(x)=x/(1-beta*(1-x))$$

Hence, we can now construct a curve split into four components (numbered I, II, III, and IV, for example) and apply slope-based control with emphasis on the components I, I & II, III & IV, and IV respectively.

In some implementations, for image tone curves it is desirable to present the user interface 100 and curve graph 102 using a perceptually uniform tone response—e.g., the standard Red, Green and Blue (sRGB) response curve, while still performing the actual curve math in a space with another tone response—e.g., a linear response. This presents the user interface 100 terms in a form closer to user experience while performing the math in a space that more closely mirrors the actual physics of the problem.

FIGS. 2A-G illustrate displaying of curve ranges in a parametric curve graph. A parameter corresponds to a range of curves that results from exploring a range of values for that parameter. A range of curves represents one or more areas about the curve 104 in the graph 102 in which all possible curves based on different values of a given parameter will lie. In the case of a space curve, a range can be two or more dimensions. When users express interest in a parameter by, for example, indicating a parameter control (e.g., 108b), the range corresponding to the parameter is automatically displayed in the graph 102 as shown by 108c, for example. This allows the user to understand both how a parameter affects the curve 104 and the range of effect that the parameter can achieve. In some implementations, users can indicate more than one parameter. For example, by holding down a keyboard modifier while moving a mouse cursor over the graph, users are able to indicate more than one region and hence more than one parameter. For brevity's sake, however, examples are generally given in terms of a single parameter.

By way of illustration, if a user positions a cursor (e.g., a mouse cursor) in an area of user interface 100 denoted by 116a, or otherwise indicates a parameter control 108a-b in area 116a, a range of curves 108c for a parameter corresponding to a control in area 116a is automatically displayed as shown by 108c in FIG. 2B. In addition, the control(s) in area 116a can also be highlighted by changing the color or brightness of the control(s), for example. Likewise, if a user positions a cursor anywhere in the region R1 of graph 102, which in this example corresponds to the same parameter, the range of curves 108c will also be displayed. Again, the control(s) corresponding to the parameter can also be highlighted. In this way, users know at a glance the relationship between a parameter control and its sphere of influence over the curve 104. Users can instantly see such relationships by, for example, moving a mouse cursor over different regions of the graph 102 or over different parameter controls.

In some implementations, if a user positions a cursor over a data point (e.g., pixel 116b), or otherwise indicates a data point in the representation of data 118, the data point 116b's value is displayed as a point 116b on the curve 104 and the range of curves (e.g., 108c) associated with the region of the graph 102 in which the point lies (e.g., R1) is automatically displayed. Control(s) corresponding to the parameter for the range of curves can also be highlighted. In a sense, selecting a data point indicates a region of a graph, a parameter, and a control. In the case of a parametric tone curve, the curve 104 illustrates where an image pixel is in tone space. Users can select data from a presentation of the data 118, such as an image, a histogram of color values for an image, an audio frequency spectrum, a histogram of frequencies for audio data, or from any other suitable presentation, and see immediately what portion of the curve 104 the data corresponds to and how to modify that portion of the curve.

Figure 2E:
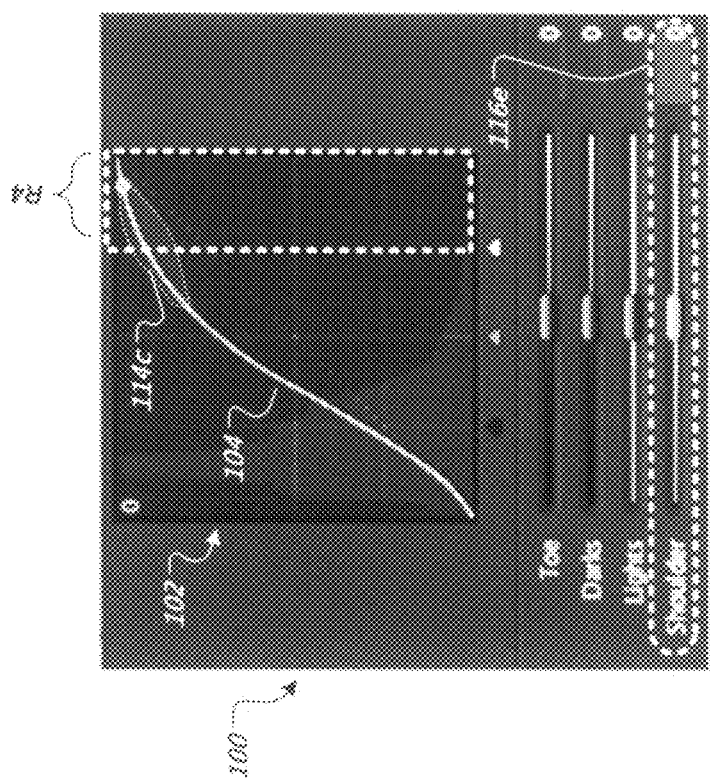

FIGS. 2C-G provide further illustrations of user interaction with user interface 100. In FIG. 2C, users can cause a range of curves 110c to be displayed and controls 110a-b to be highlighted, by moving a cursor in region R2 of graph 102, or by moving a cursor into, or indicating a control in, region 116c. Similarly, in FIG. 2D, users can cause a range of curves 112c to be displayed and controls 112a-b to be highlighted, by moving a cursor in region R3 of graph 102, or by moving a cursor in, or indicating a control in, region 116d. In FIG. 2E, users can cause a range of curves 114c to be displayed and controls 114a-b to be highlighted, by moving a cursor in region R4 of graph 102, or by moving a cursor in, or indicating a control in, region 116e.

Figure 2G:
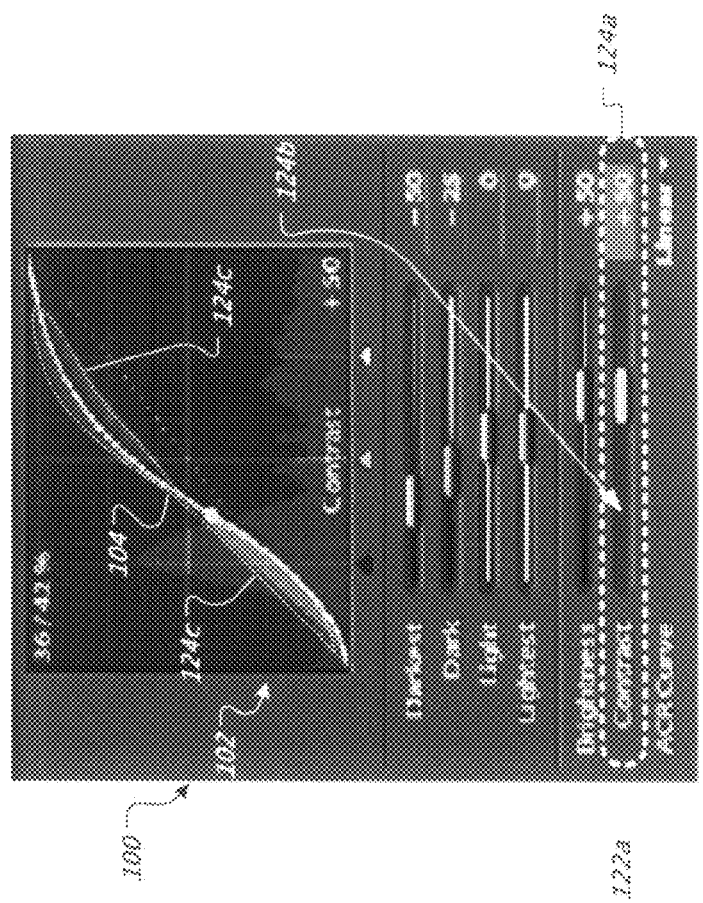
Figure 2F:
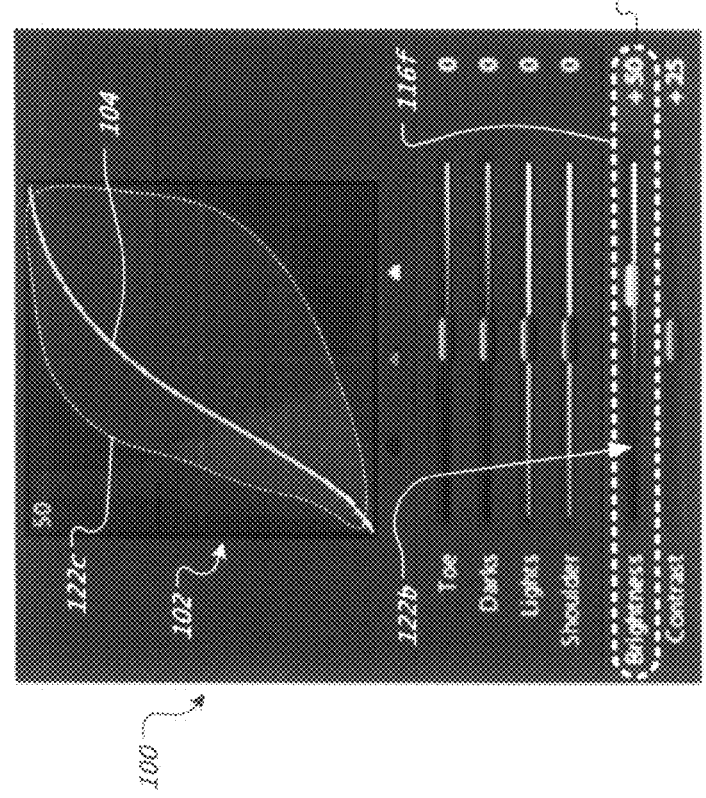

Some parameters can have an influence over the shape of the entire curve 104, as illustrated in FIGS. 2F-G. For example, brightness controls 122a-b and contrast controls 124a-b correspond to parameters that have an effect over the full curve 104. The brightness controls 122a-b are associated with a parameter that has a range of curves 122c. The contrast controls 124a-b are associated with a parameter that has a range of curves 124c. In this case, the range of curves 124c falls above and below the current curve 104 at different positions along the curve 104.

Figure 3:
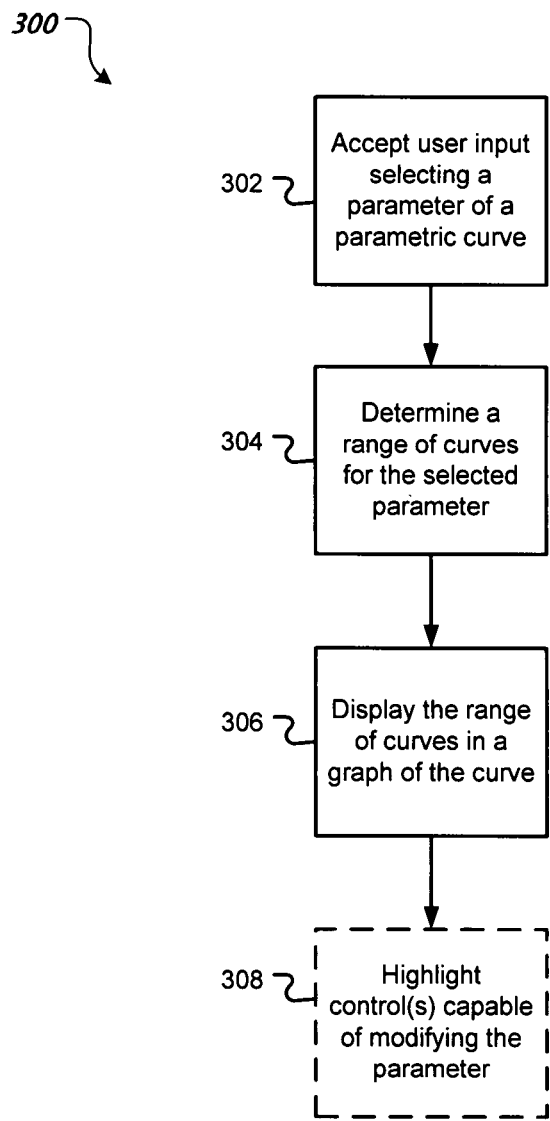
FIG. 3 is a flow chart illustrating a method for displaying a range of curves.

FIG. 3 is a flow chart illustrating a method 300 for displaying a range of curves. User input selecting a parameter of a parametric curve is accepted (step 302). For example, a user can do so by moving a cursor close to or by indicating a parameter control (e.g., 112b), by moving a cursor within a region of graph 102, or by indicating a data point in a representation of a data set 118. A range of curves for the selected parameter is determined (step 304). This may be determined on the fly or ahead of time. The range of curves is displayed in a graph of the curve (e.g., 108c; step 306). Control(s) capable of modifying the parameter are optionally highlighted (e.g., 112b; step 308).

Parameter values can be modified through user interaction with the graph 102, a parameter control (e.g., 108a-b), or a representation of data (e.g. 118). User interaction is mapped to one or more parameters whose values are changed. In some implementations, users can manipulate parameter controls through the user interface 100. For example, the slider parameter control 112b can be moved to the left or to the right to indicate lesser or greater values for the slider's associated parameter, respectively. Explicit parameter controls such as these are optional, however, since users can also modify parameters in other ways.

In other implementations, gestures (e.g., mouse cursor movement) within the area of the graph 102 can be interpreted to modify the parameter(s) associated with the region(s) (e.g., R1) the gestures fall in. Notice that such gestures do not "grab" the curve 104—the gestures "grab" the underlying parameter(s) of one or more regions. Referring to FIG. 2A and by way of example, by dragging a mouse cursor up or down (or left or right) in region R1, the parameter associated with region R1 is increased or decreased in value, respectively. Alternatively, gestures that fall outside of the graph 102 can also be interpreted to modify parameters associated with a region of the graph 102. For example, a user can select a modifier key or mouse button while a mouse cursor is inside of a graph region, and then create gestures outside of the graph region. By selecting the modifier key or mouse button while in the region, the user has tied subsequent mouse gestures to the parameter associated with that region until the modifier key or mouse button is released. In some implementations, gestures (e.g., mouse cursor movement) within the area of the data representation 118 can be interpreted to modify the parameter(s) associated with the region (e.g., R1) a selected data point (e.g., 116b) falls in.

In some implementations, as the user moves a cursor over the curve graph 102, different regions highlight and, for example, the cursor icon changes appearance to indicate that the user can click-and-drag a mouse vertically to adjust the parameter corresponding to the region. When the user clicks a mouse button, the cursor is hidden and vertical movement is mapped to changes in the parameter value. The range of movement used to control the parameter can be arbitrary. In particular, unlike point-based curves where a small movement in the curve must be represented by a small and therefore imprecise mouse movement, even small changes can receive ample precision for the drag operation. If it is more appropriate to modify the parameter by dragging horizontally this is also allowed. In further implementations, if two parameters are indicated (e.g., by selecting more than one graph region or parameter control as described above), users could use vertical gestures to modify one parameter and horizontal gestures to modify the other.

The gestures described above for the graph 102 and the data representation 118 can also be accomplished through keyboard input or other user input. For example, users can use a mouse or other input device to indicate a parameter through the curve regions mechanism while using the keyboard to increment and decrement the parameter.

Figure 4A:
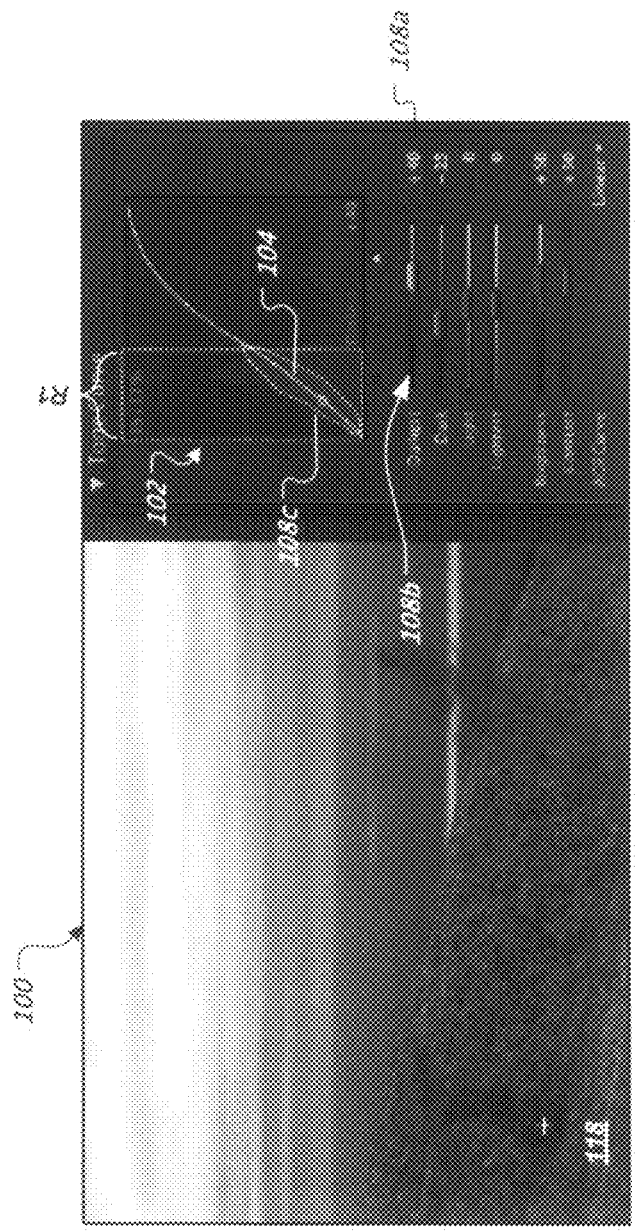
FIGS. 4A-B illustrate user modification of a parametric curve parameter.
Figure 4B:
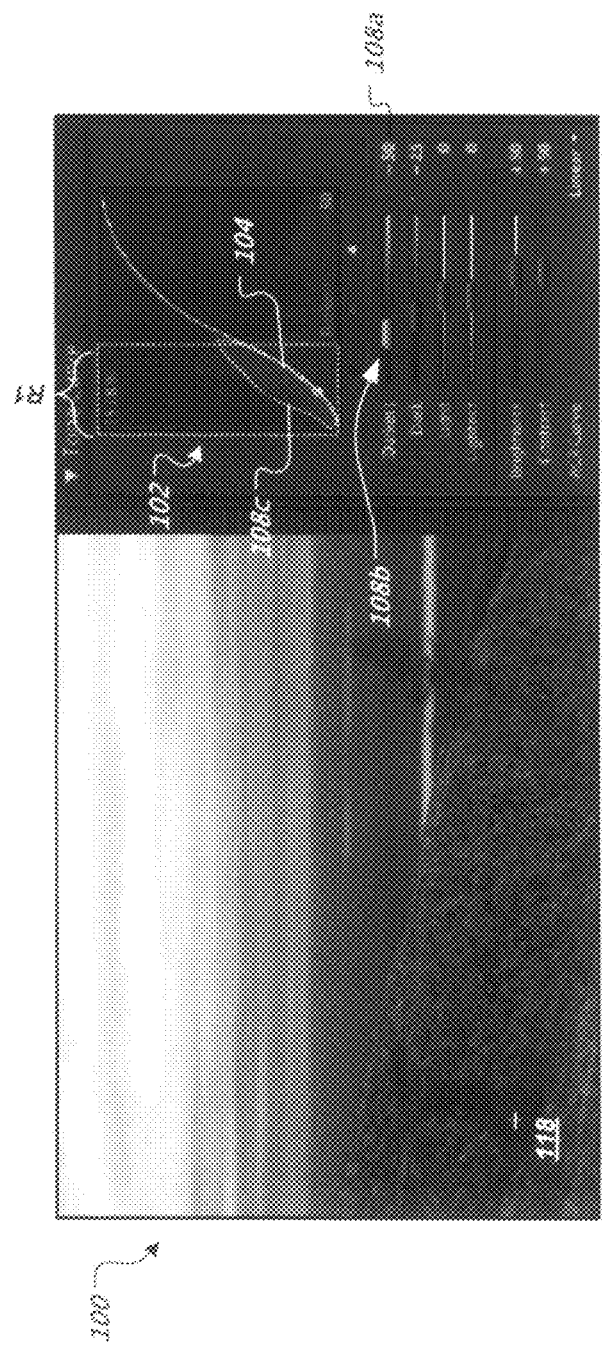

FIGS. 4A-B illustrate user modification of a parametric curve parameter. FIG. 4A shows a parametric curve graph 102 with the range of curves 108c displayed along curve 104. The current shape of the curve 104 roughly passes through the center of the range of curves 108c. By adjusting the parameter control 108a or 108b corresponding to region R1, for example, users can change the shape of the curve 104 within the boundary of the range of curves 108c. In this example, the tone of the darkest colors in the image 118 is decreased by movement of the slider 108b to the left of center thereby making these colors appear darker in the image 118. FIG. 4B shows the modified curve 104 which now lies near the bottom of the range of curves 108c.

Figure 5:
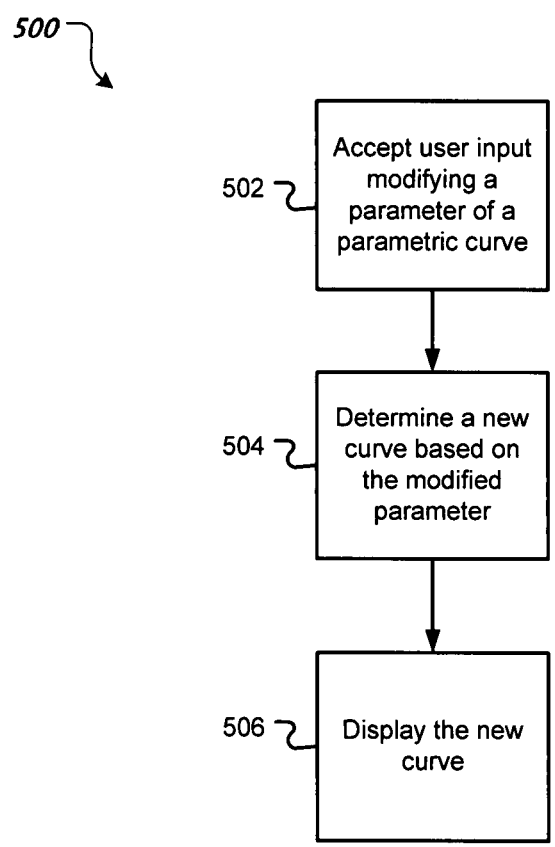
FIG. 5 is a flow chart illustrating a method for modification of a parametric curve parameter.

FIG. 5 is a flow chart illustrating a method 500 for modification of a curve parameter. User input modifying a parameter of a parametric curve (e.g., curve 104 in FIG. 4A) is accepted (step 502). For example, users can perform mouse gestures on the user interface 100 or interact directly with parameter controls (e.g., 108a or 108b), as described above. A new curve is determined based on the modified parameter (step 504). The new curve is then displayed in a graph (e.g., curve 104 in FIG. 4B; step 506).

Figure 6A:
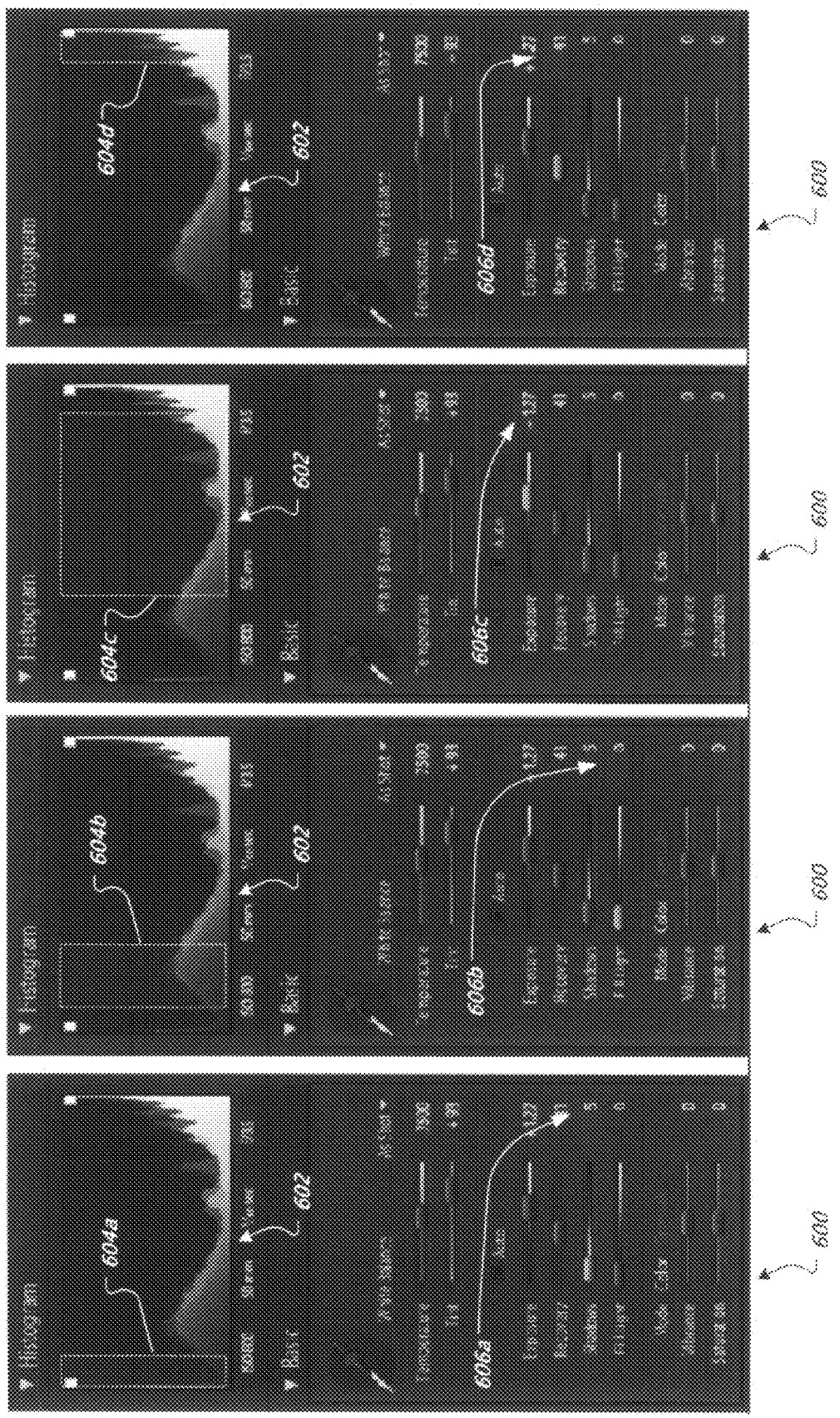
FIG. 6A shows a user interface for changing the value of a parameter based on interaction with a graph.

FIG. 6A shows a user interface 600 for changing the value of a parameter based on interaction with a graph 602. In some implementations, users may wish to modify a parameter value by interacting with a graph instead of interacting with a parameter control directly, regardless of whether the graph represents a parametric function. A graph's area can be divided into one or more regions that, when interacted with, modify one or more associated parameter values. For example, graph 602 is a histogram of output color distribution in an image. Region 604a of graph 602 is associated with a parameter control 606a. Likewise, region 604b is associated with parameter control 606b, region 604c is associated with parameter 606c, and region 604d is associated with parameter control 604d. When a user moves a mouse cursor, for example, in any of the regions 604a-d, the region is highlighted or displayed and the corresponding control 606a-d is highlighted and can be modified by using mouse gestures or other user input, as described above. Regions need not all be the same size and shape. In various implementations, moving a mouse cursor on a histogram does not change the parametric tone curve in the other diagrams. Instead, it parametrically changes the image in other ways, which are then reflected by changes seen in the histogram graph 602.

Figure 6B:
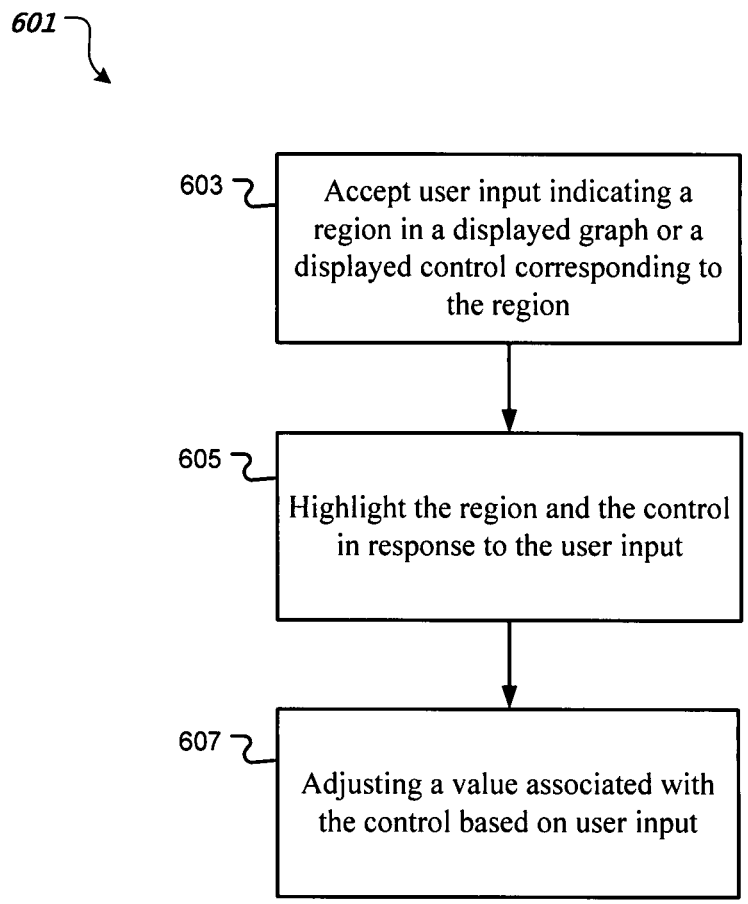
FIG. 6B is a flow chart of a method for changing the value of a parameter based on interaction with a graph.

FIG. 6B is a flow chart illustrating a method 601 for changing the value of a parameter based on interaction with a graph. User input is accepted indicating a region (e.g., 604a) in a displayed graph (e.g., 602) or indicating a displayed control (e.g., 606a) corresponding to the region, the control being in a separate display area from the graph (step 603). The region and the control are then automatically highlighted in response to the user input (step 605). A value associated with the control is modified based on additional user input (step 607).

Figure 7:
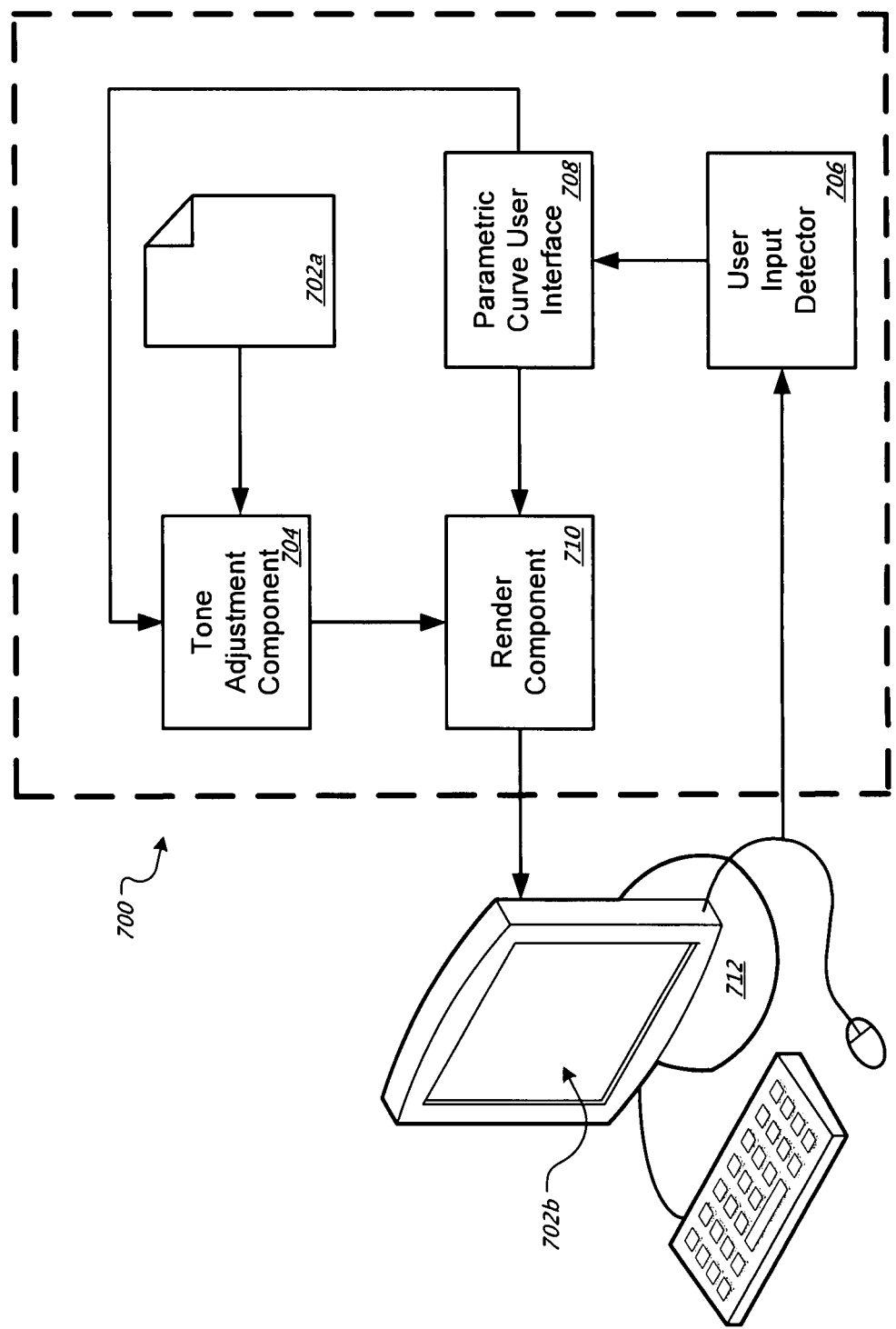
FIG. 7 shows a system for enabling user interaction with parametric curves.

FIG. 7 shows a system 700 for enabling user interaction with parametric curves. Although several components are illustrated, there may be fewer or more components in the system 700. Moreover, the components can be distributed on one or more computing devices connected by one or more networks or other suitable communication means. A user can interact with the system 700 through a computer 712 or other device. For example, the computer 712 can be a computer terminal within a local area network (LAN) or wide area network (WAN). In particular, the user may be utilizing a digital image management and processing application such as Adobe Photoshop Lightroom from Adobe Systems Incorporated of San Jose, Calif. The user can manipulate an image 702b or other data through interaction with a parametric curve user interface 100, as described above. The user interface 100 is generated by a user interface component 708 and rendered on the computer 712's display device by render component 710. User interaction with the user interface 100 is received by a user input detector component 706 which provides the input to the user interface component 708 for processing. The user interface component 708 updates the user interface 100 to reflect the user input such by displaying ranges of curves and highlighting parameter controls. The user interface component 708 can also signal a tone adjustment component 704 (or other suitable component) if the user has modified a parameter of the parametric function controlling color tone.

The tone adjustment component 704 then updates tone in an input image 702a which is then provided to the render component 710 and rendered as image 702b.

Figure 8:
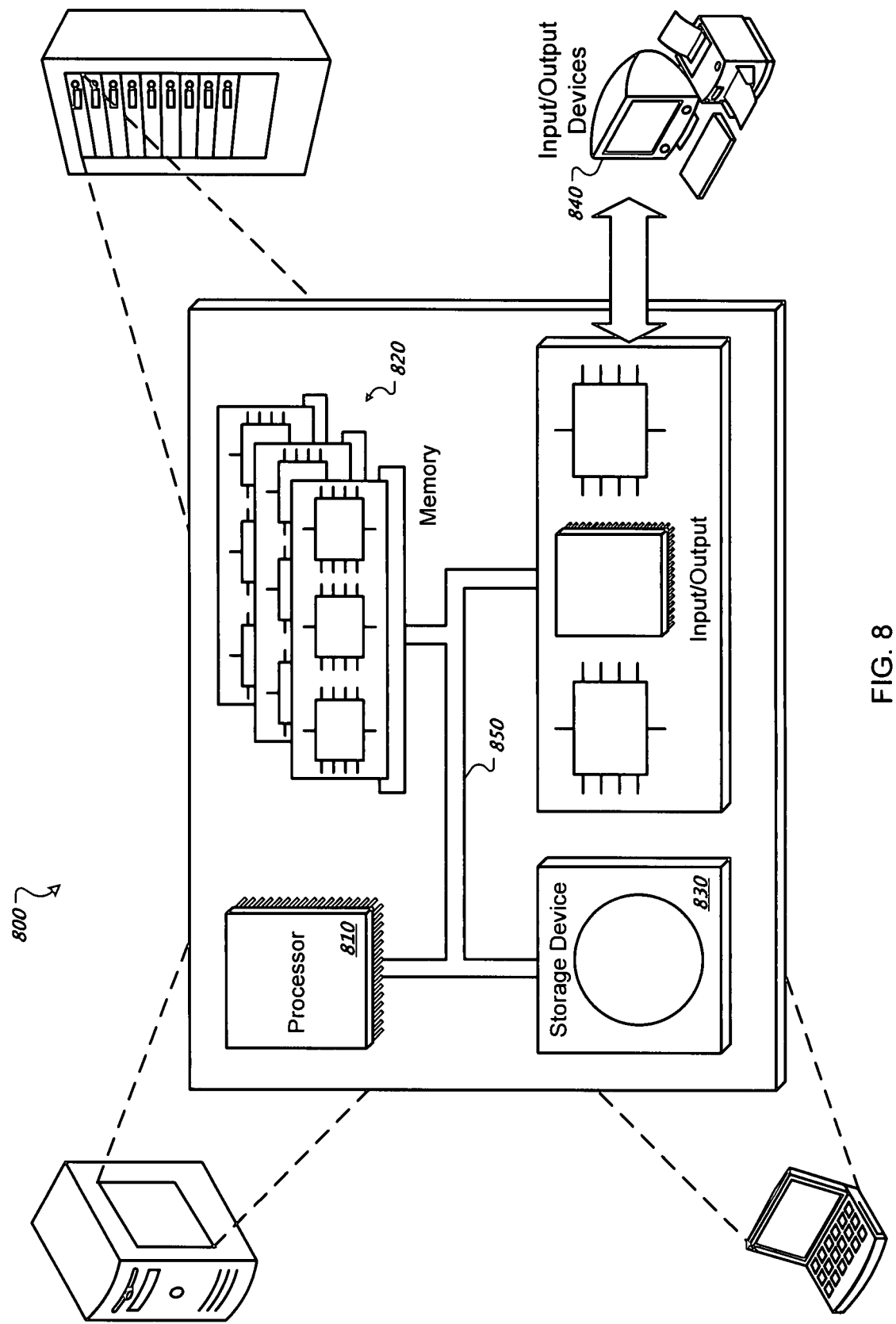
FIG. 8 is a schematic diagram of a generic computer system.

FIG. 8 is a schematic diagram of a generic computer system 800. The system 800 can be used for practicing operations described in association with the methods 300, 500, 601 and system 700. The system 800 can include processors 810, memories 820, storage devices 830, and input/output devices 840. Each of the components 810, 820, 830, and 840 are interconnected using a system bus 850. The processor 810 is capable of processing instructions for execution within the system 800. Such executed instructions can implement one or more components of system 700, for example. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 is a computer readable medium such as volatile or non volatile random access memory that stores information within the system 800. The memory 820 could store data structures representing digital image data and parametric curve parameters, for example. The storage device 830 is capable of providing persistent storage for the system 800. The storage device 830 may be a floppy disk device, a hard disk device, an optical disk device, or a tape device, or other suitable persistent storage means. The input/output device 840 provides input/output operations for the system 800. In one implementation, the input/output device 840 includes a keyboard and/or pointing device. In another implementation, the input/output device 840 includes a display unit for displaying graphical user interfaces.

The input/output device 840 can provide input/output operations for the system 700. The system 700 can include computer software components as described above. Examples of such software components include the user input detector 706, a user interface 708, a render component 710 and a tone adjustment component 704, to name a few examples.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A user interface can receive user input from, for example, a mouse, a trackball, a dial, a touch pad, a keyboard, a microphone, a video camera, a device capable of measuring a user's physiological changes, or combinations of these. By way of further example, user input can include mouse gestures, dial movements, keystrokes, sounds, verbal commands, facial expressions, eye movements, brain waves, or combinations of these.

A digital image does not necessarily correspond to a file. An image may be stored in a portion of a file that holds other images, in a single file dedicated to the image in question, or in multiple coordinated files. Moreover, an image can be stored in memory without first having been stored in a file.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
    displaying a graph on a display device, the graph including a parametric curve;
    receiving through a user interface device user input identifying a parameter for the parametric curve, wherein the parametric curve is dependent upon a value of the parameter;
    using a data processor to identify a range of values for the parameter, wherein the range of values is identified independent of the user input identifying the parameter;
    using a data processor to determine a range of curves for the parametric curve based on the identified range of values for the parameter, the range of curves representing all curves resulting from values of the parameter within the identified range of values for the parameter; and
    updating the graph displayed on the display device to include within the graph a highlighted area corresponding to the range of curves for the parameter, the highlighted area including a visual indication having a visually distinct appearance relative to areas outside the highlighted area in the graph.

2. The method of claim 1, further comprising:
    highlighting a control corresponding to the parameter.

3. The method of claim 1, where the user input is one of:
    indication of a parameter control, indication of a region in the graph, or indication of a pixel in an image corresponding to a location on the curve.

4. The method of claim 1, further comprising:
    receiving through the user interface device user input modifying a value of the parameter.

5. The method of claim 4 where the user input is one or more of:
    a mouse gesture or a keystroke.

6. The method of claim 5 where:
    an upward mouse gesture increases a value of the parameter and a downward mouse gesture decreases a value of the parameter.

7. The method of claim 4, further comprising:
    using a data processor to determine a new curve based on the value of the parameter; and
    updating the graph displayed on the display device to include the new curve in the graph.

8. The method of claim 1 where:
    the curve is a combination of cubic curves.

9. The method of claim 8 where:
    the parameter controls a slope of the curve.

10. The method of claim 1 where:
    the parameter does not correspond to a location along the graph of the curve.

11. The method of claim 1 where:
    the curve determines tone for an image.

12. The method of claim 1, wherein the range of curves is determined prior to receiving the user input.

13. The method of claim 1, wherein the range of curves is determined after receiving the user input.

14. A computer-implemented method, comprising:
- displaying on a display device a graphical user interface that includes a graph and a control in a separate display area from the graph, the control corresponding to a region within the graph and associated with a value of a parameter for data presented in the graph, the region identified independent of user input;
- receiving through a user interface device a first user input indicating at least one of the region or the control;
- updating the graphical user interface by highlighting the region and the control in response to the first user input, wherein highlighting the region includes modifying the appearance of the region to include a visual indication having a visually distinct appearance relative to areas outside the highlighted region in the graph; and
- updating the value in a memory based on second user input received through a user interface device.

15. The method of claim 14 where:
the second user input is a mouse gesture.

16. The method of claim 15 where:
an upward mouse gesture increases the value and a downward mouse gesture decreases the value.

17. The method of claim 14 where:
the second user input is incident on the displayed graph.

18. The method of claim 14 where:
the displayed graph is a histogram.

19. A computer program product, encoded on a computer-readable medium, operable to cause data processing apparatus to perform operations comprising:
- displaying a graph on a display device, the graph including a parametric curve;
- receiving through a user interface device user input identifying a parameter for the parametric curve, wherein the parametric curve is dependent upon a value of the parameter;
- using a data processor to identify a range of values for the parameter, wherein the range of values is identified independent of the user input identifying the parameter;
- determining a range of curves for the parametric curve based on the range of values for the parameter, the range of curves representing all curves resulting from values of the parameter within the identified range of values for the parameter; and
- updating the graph displayed on the display device to include within the graph a highlighted area corresponding to the range of curves for the parameter, the highlighted area including a visual indication having a visually distinct appearance relative to areas outside the highlighted area in the graph.

20. The program product of claim 19, further comprising the following operations:
highlighting a control corresponding to the parameter.

21. The program product of claim 19, where the user input is one of:
indication of a parameter control, indication of a region in the graph, or indication of a pixel in an image corresponding to a location on the curve.

22. The program product of claim 19, further comprising the following operations:
receiving through a user interface device user input modifying a value of the parameter.

23. The program product of claim 22 where the user input is one or more of:
a mouse gesture or a keystroke.

24. The program product of claim 23 where:
an upward mouse gesture increases a value of the parameter and a downward mouse gesture decreases a value of the parameter.

25. The program product of claim 22, further comprising:
using a data processor to determine a new curve based on the value of the parameter; and
updating the graph displayed on the display device to include the new curve in the graph.

26. The program product of claim 19 where:
the curve is a combination of cubic curves.

27. The program product of claim 26 where:
the parameter controls a slope of the curve.

28. The program product of claim 19 where:
the curve determines tone for an image.

29. A computer program product, encoded on a computer-readable medium, operable to cause data processing apparatus to perform operations comprising:
- displaying on a display device a graphical user interface that includes a graph and a control in a separate display area from the graph, the control corresponding to a region within the graph and associated with a value of a parameter for data presented in the graph, the region identified independent of user input;
- receiving through a user interface device a first user input indicating at least one of the region or the;
- updating the graphical user interface by highlighting the region and the control in response to the first user input, wherein highlighting the region includes modifying the appearance of the region to include a visual indication having a visually distinct appearance relative to areas outside the highlighted region in the graph; and
- updating the value in a memory based on second user input received through a user interface device.

30. The program product of claim 29 where:
the first user input is a mouse gesture.

31. The program product of claim 30 where:
an upward mouse gesture increases the value and a downward mouse gesture decreases the value.

32. The program product of claim 30 where:
the gesture input is incident on the displayed graph.

33. The program product of claim 29 where:
the displayed graph is a histogram.

34. A system comprising:
- a display device adapted to display a graph including:
  - a parametric curve, and
  - a highlighted area within the graph corresponding to a range of curves for the parametric curve, the highlighted area including a visual indication having a visually distinct appearance relative to areas outside the highlighted area in the graph;
- a user interface device that receives user input identifying a parameter for the parametric curve; and
- means for determining the range of curves for the parametric curve based on a range of values for the parameter, the range of values determined independent of the user input, the range of curves representing all curves resulting from values of the parameter within the range of values for the parameter.

* * * * *

UNITED STATES PATENT AND TRADEMARK OFFICE
CERTIFICATE OF CORRECTION

PATENT NO. : 8,487,931 B2  
APPLICATION NO. : 11/821399  
DATED : July 16, 2013  
INVENTOR(S) : Troy A. Gaul et al.

Page 1 of 1

It is certified that error appears in the above-identified patent and that said Letters Patent is hereby corrected as shown below:

In the Claims:

Column 14, Line 28, insert -- control -- between "...region or the" and ";", therefor.

Signed and Sealed this
Twenty-second Day of October, 2013

Teresa Stanek Rea
*Deputy Director of the United States Patent and Trademark Office*